US012393462B2

(12) United States Patent
Liu et al.

(10) Patent No.: US 12,393,462 B2
(45) Date of Patent: Aug. 19, 2025

(54) DYNAMIC CLUSTERING OF EDGE CLUSTER RESOURCES

(71) Applicant: International Business Machines Corporation, Armonk, NY (US)

(72) Inventors: Guang Ya Liu, Xian (CN); Guang Han Sui, Beijing (CN); Xun Pan, Xian (CN); Xiao Liang Hu, Xi'an (CN)

(73) Assignee: International Business Machines Corporation, Armonk, NY (US)

(*) Notice: Subject to any disclaimer, the term of this patent is extended or adjusted under 35 U.S.C. 154(b) by 273 days.

(21) Appl. No.: 17/358,129

(22) Filed: Jun. 25, 2021

(65) Prior Publication Data

US 2022/0413925 A1 Dec. 29, 2022

(51) Int. Cl.
*G06F 9/50* (2006.01)

(52) U.S. Cl.
CPC .......... *G06F 9/5038* (2013.01); *G06F 9/5072* (2013.01); *G06F 9/5077* (2013.01); *G06F 2209/5014* (2013.01); *G06F 2209/505* (2013.01)

(58) Field of Classification Search
CPC .... G06F 9/5038; G06F 9/5072; G06F 9/5077; G06F 2209/5014; G06F 2209/505; G06F 9/5022; G06F 9/505; G06F 9/5088
See application file for complete search history.

(56) References Cited

U.S. PATENT DOCUMENTS

| 8,307,070 B2 | 11/2012 | Jeong |
| 10,225,206 B2 | 3/2019 | Amulothu |
| 10,791,168 B1* | 9/2020 | Dilley .................. H04L 67/288 |
| 11,327,806 B1* | 5/2022 | Nagaraja ............... G06F 9/5077 |
| 2006/0143495 A1 | 6/2006 | Bozak |
| 2018/0167483 A1 | 6/2018 | Cannon |
| 2019/0116128 A1 | 4/2019 | Guo |
| 2019/0147093 A1* | 5/2019 | Ikkaku .................. G06F 16/285 707/737 |
| 2019/0182333 A1* | 6/2019 | Bartfai-Walcott ...... H04L 47/70 |

(Continued)

FOREIGN PATENT DOCUMENTS

| CN | 112068964 A | 12/2020 | |
| WO | WO-2016076900 A1 * | 5/2016 | ............. G06F 21/85 |
| WO | 2019076315 A1 | 4/2019 | |

OTHER PUBLICATIONS

"Use empty edge nodes on Apache Hadoop clusters in HDInsight", Azure, Microsoft Docs, Jun. 13, 2019, 6 pages, <https://docs.microsoft.com/en-us/azure/hdinsight/hdinsight-apps-use-edge-node>.

(Continued)

*Primary Examiner* — Aimee Li
*Assistant Examiner* — Hsing Chun Lin
(74) *Attorney, Agent, or Firm* — Jordan T. Schiller

(57) ABSTRACT

Methods, computer program products, and/or systems are provided that perform the following operations: identifying, in an environment that includes a plurality of edge clusters of edge nodes, a first edge cluster having a resource gap; broadcasting a resource requirement of the first edge cluster to other edge clusters in the plurality; obtaining resource commitments from one or more of the other edge clusters; selecting edge cluster resources from the one or more of the other edge clusters based, at least in part, on the resource commitments; and creating a new cluster including the first edge cluster and the selected edge cluster resources.

17 Claims, 10 Drawing Sheets

(56) References Cited

U.S. PATENT DOCUMENTS

| | | | |
|---|---|---|---|
| 2019/0327506 A1 | 10/2019 | Zou | |
| 2021/0011765 A1* | 1/2021 | Doshi | G06F 9/5077 |
| 2021/0037091 A1* | 2/2021 | Prabhu | H04L 43/0811 |
| 2021/0203554 A1* | 7/2021 | Peng | H04L 67/1008 |
| 2021/0377336 A1* | 12/2021 | Lincourt | H04L 47/822 |
| 2022/0318065 A1* | 10/2022 | Chen | G06F 9/5072 |

OTHER PUBLICATIONS

Authors et al.: Disclosed Anonymously, "System and Method for Proactive Resource Share of Edge Computing Clusters", IP.com No. IPCOM000263009D, IP.com Electronic Publication Date: Jul. 22, 2020, 3 pages.

Essameldin et al., "The Hive: An Edge-based Middleware Solution for Resource Sharing in the Internet of Things", SmartObjects'17, Oct. 16, 2017, Snowbird, UT, USA, Session 1, pp. 13-18, <https://doi.org/http://dx.doi.org/10.1145/3127502.3127508>.

Li et al., "A new load balancing strategy by task allocation in edge computing based on intermediary nodes", Journal on Wireless Communications and Networking (2020) 2020:3, 10 pages, <https://doi.org/10.1186/s13638-019-1624-9>.

Li et al., "Resource Scheduling Based on Improved Spectral Clustering Algorithm in Edge Computing", Hindawi Scientific Programming, vol. 2018, Article ID 6860359, 13 pages, https://doi.org/10.1155/2018/6860359.

Mell et al., "The NIST Definition of Cloud Computing", Recommendations of the National Institute of Standards and Technology, Special Publication 800-145, Sep. 2011, 7 pages.

O'Keefe, Megan, "Edge Computing and the Cloud-Native Ecosystem", The New Stack, Apr. 18, 2018, 13 pages, <https://thenewstack.io/edge-computing-and-the-cloud-native-ecosystem/>.

Wang et al., "ENORM: A Framework for Edge NOde Resource Management", Article in IEEE Transactions on Services Computing—Sep. 2017, Manuscript received Jan. 6, 2017, DOI: 10.1109/TSC.2017.2753775, 15 pages.

Zafari et al., "Resource Sharing in the Edge: A Distributed Bargaining-Theoretic Approach", arXiv:2001.04229v3 [cs.GT] Jul. 4, 2020, 12 pages.

* cited by examiner

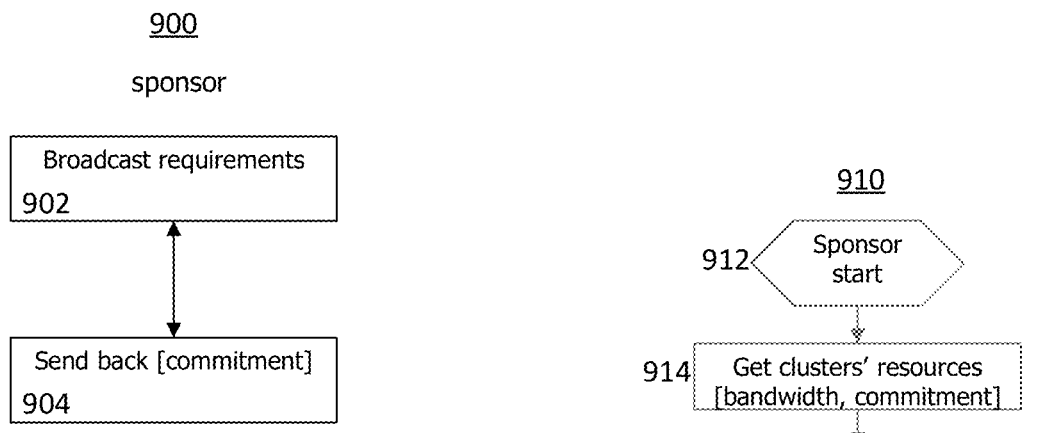
FIG. 9A
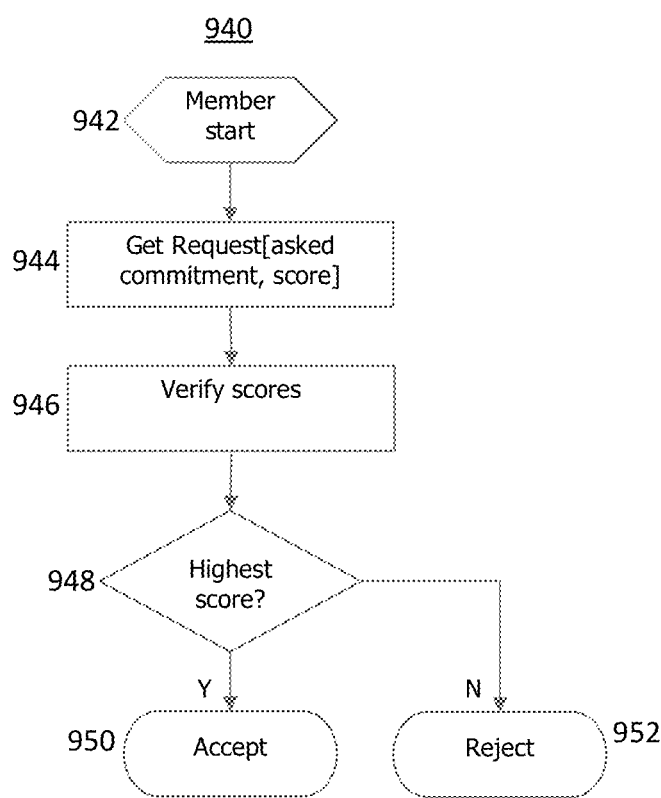
FIG. 9B
FIG. 9C

DYNAMIC CLUSTERING OF EDGE CLUSTER RESOURCES

BACKGROUND

The present invention relates generally to the field of cloud computing, and more particularly to providing for dynamically organizing hive clusters based on computing workload.

SUMMARY

According to an aspect of the present invention, there is a method, computer program product and/or system that performs the following operations (not necessarily in the following order): identifying, in an environment that includes a plurality of edge clusters of edge nodes, a first edge cluster having a resource gap; broadcasting a resource requirement of the first edge cluster to other edge clusters in the plurality; obtaining resource commitments from one or more of the other edge clusters; selecting edge cluster resources from the one or more of the other edge clusters based, at least in part, on the resource commitments; and creating a new cluster including the first edge cluster and the selected edge cluster resources.

BRIEF DESCRIPTION OF THE DRAWINGS

FIGS. 9A through 9C depict workflow diagrams of an example hive cluster generation based on edge cluster resources, according to embodiments of the present invention.

DETAILED DESCRIPTION

Figure 1:
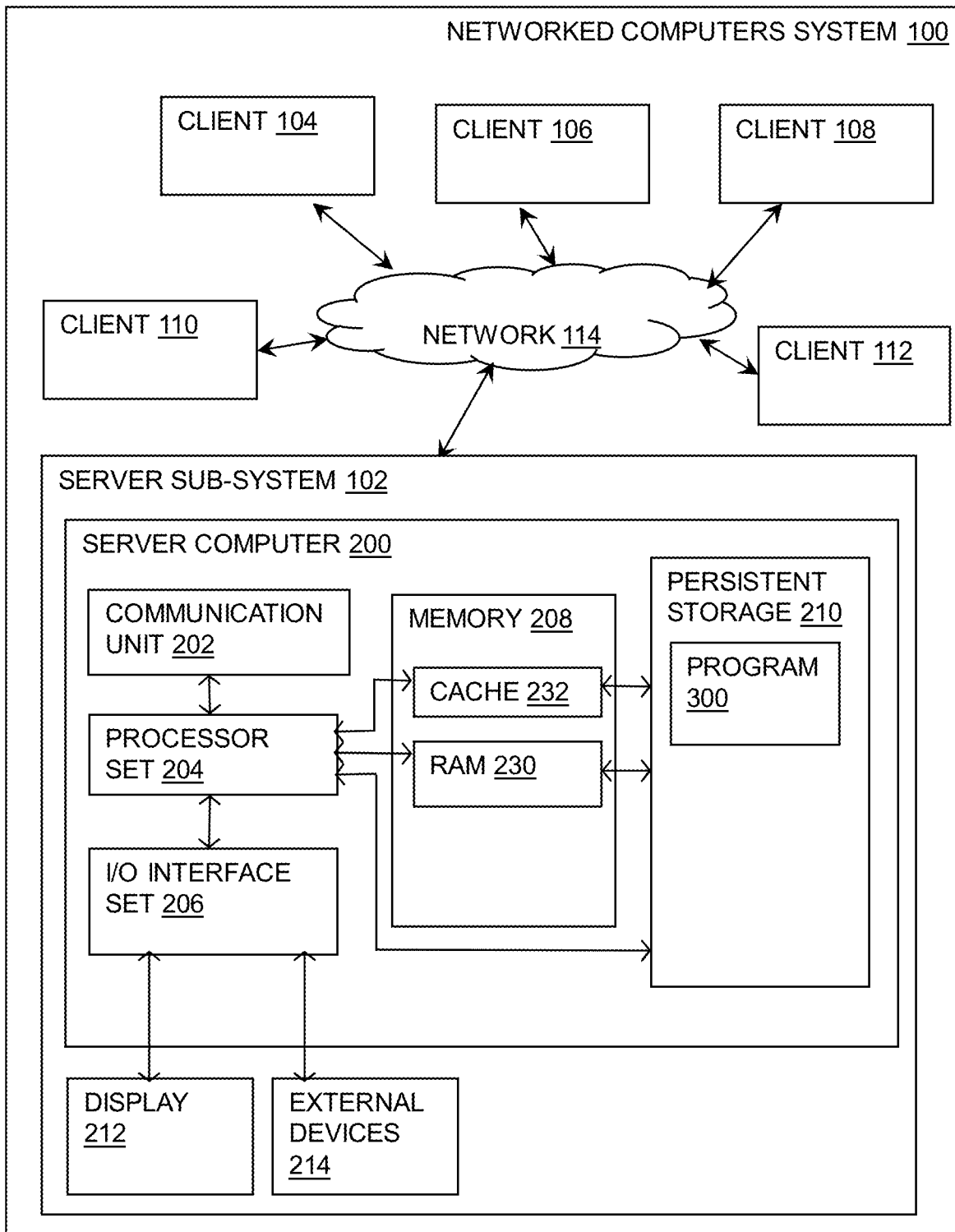
FIG. 1 depicts a block diagram view of a first embodiment of a system, according to the present invention.

According to aspects of the present disclosure, systems and methods can be provided to dynamically create hive clusters. In particular, systems and methods of the present disclosure can provide for identifying a resource gap/shortage at an edge cluster (e.g., heavy workload that cannot be handled on time, etc.). The systems and methods of the present disclosure can provide for identifying the edge cluster having the resource gap as a sponsor cluster to initiate hive cluster creation. The systems and methods of the present disclosure can provide for broadcasting a sponsor cluster resource requirement to other edge clusters. The systems and methods of the present disclosure can provide for obtaining resource commitments from edge clusters with idle resources. The systems and methods of the present disclosure can provide for selecting enough resources from a set of edge clusters, based on the resource commitments, to create a dynamic hive cluster. In some embodiments, the systems and methods of the present disclosure can provide for distributing the sponsor cluster workload over the members of the hive cluster.

In general, edge computing is a distributed computing paradigm which brings computation and data storage closer to a location where it is needed, for example, to improve response times, save bandwidth, and/or the like. An edge cluster is a resource aggregation unit that can be used to compute workload for local data of edge devices. In some cases, edge devices may be heterogenous and the computing resources in an edge cluster may also be heterogenous. Generally, for an Edge cluster, resource usage may not be predictable and may dynamically change over time.

At times, it may become challenging to balance workload on each edge cluster, for example, in a potentially unbalanced situation where data cannot be handled by local cluster resources and other edge clusters handling other data are not fully using the computing resources in the cluster.

Accordingly, systems and methods of the present disclosure can provide for creating dynamic hive clusters which include a set of edge clusters. A cluster can initiate a hive cluster organization on demand, for example, when the cluster has a heavy workload and becomes a sponsor cluster for the new hive cluster.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can allow for identifying a resource gap/shortage for a cluster, broadcasting resource requirement(s) to other clusters, obtaining resource commitments, selecting resources from a set of clusters to create a hive cluster, distribute workload to leverage hive cluster member resources, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
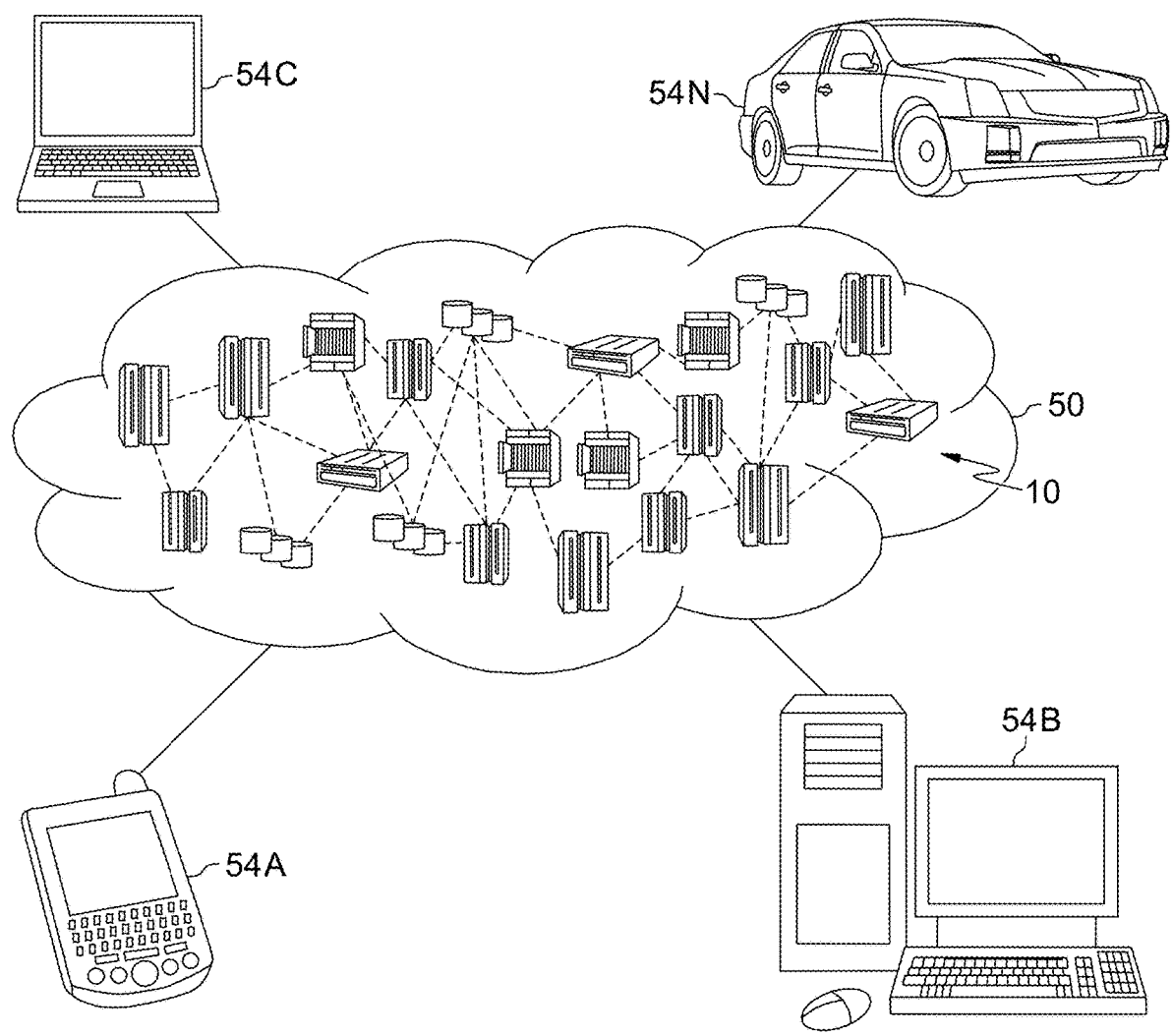
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
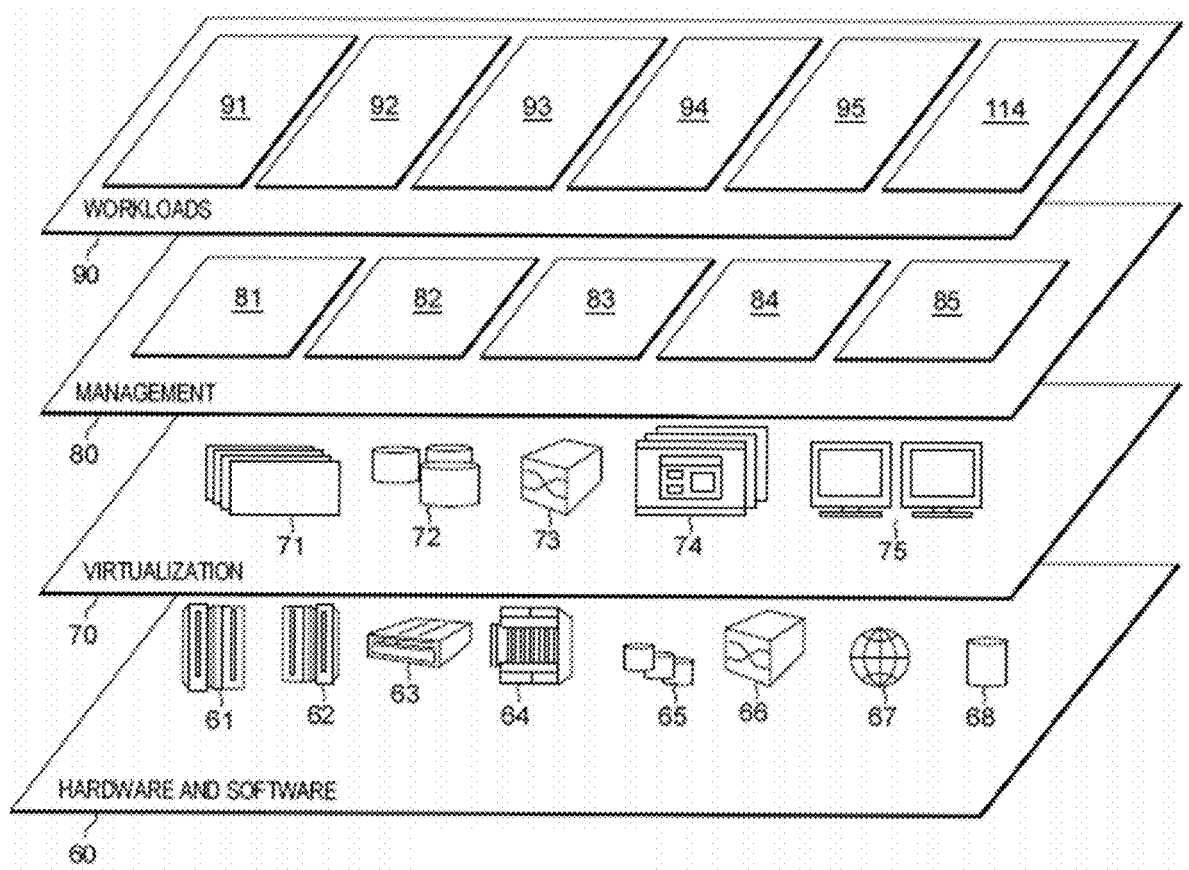
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and edge cluster workload management 96.

Example Embodiments

Figure 4:
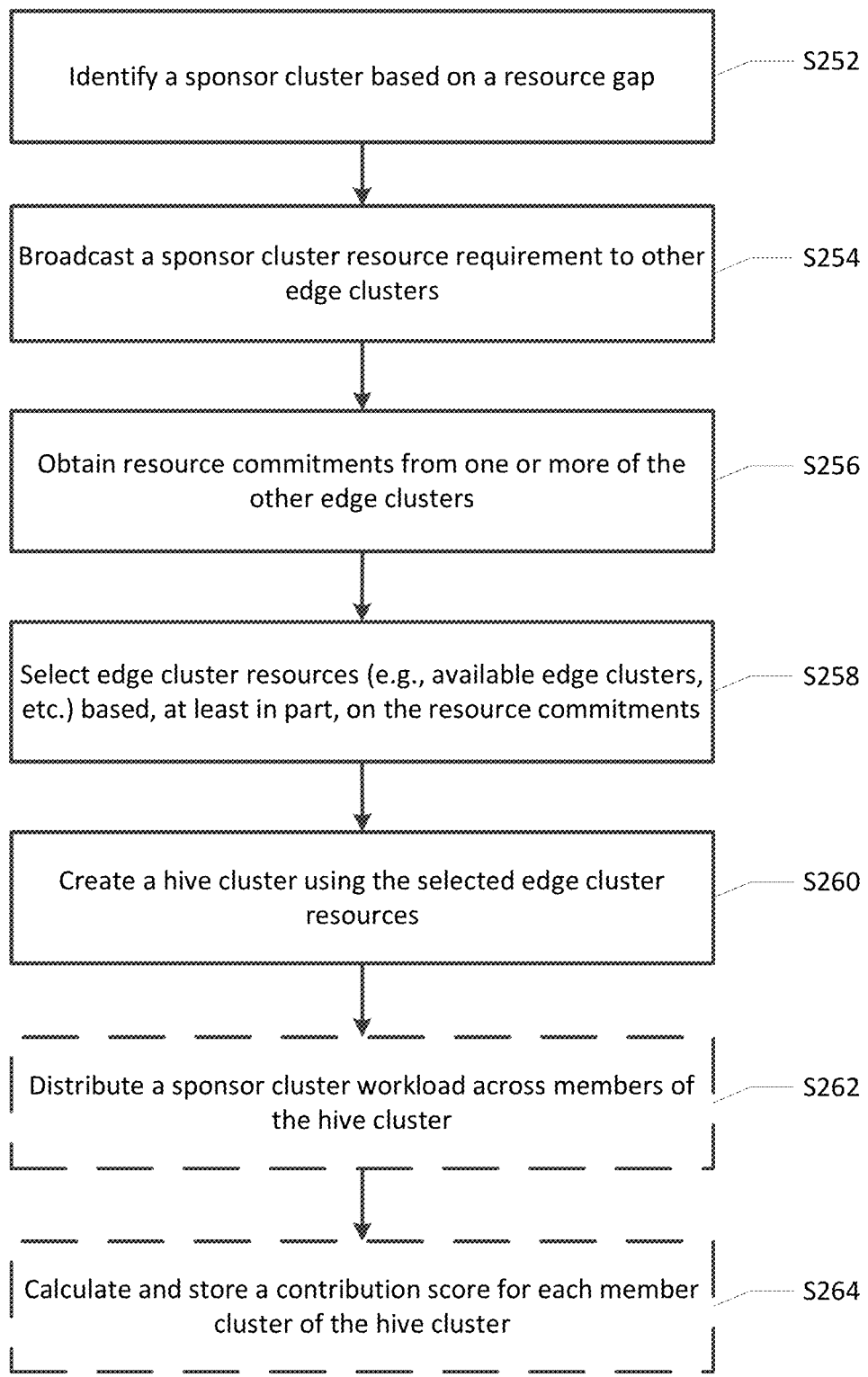
FIG. 4 depicts a flowchart showing a first embodiment method performed, at least in part, by the first embodiment system.
Figure 5:
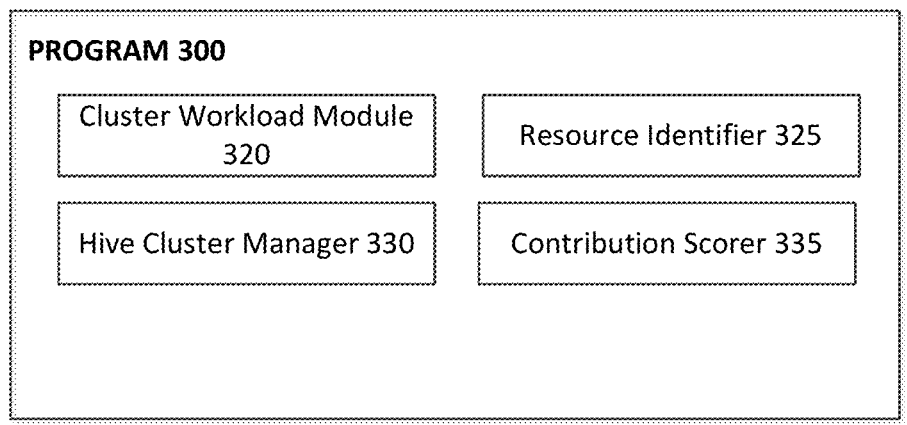
FIG. 5 depicts a block diagram showing an example machine logic (for example, software) portion of the first embodiment system.

FIG. 4 shows flowchart 250 depicting a computer-implemented method, according to embodiment(s) of the present invention. FIG. 5 shows a program 300 for performing at least some of the method operations of flowchart 250. Regarding FIG. 4, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 4 (for the method operation blocks) and FIG. 5 (for the software blocks).

As illustrated in FIG. 4, in some embodiments, operations for dynamic hive cluster management begin at operation S252, where a computing system (e.g., server computer 200 of FIG. 1 or the like) can identify a sponsor cluster based on a resource gap. In some embodiments, for example, an edge cluster may have a heavy pending workload, a computing power gap, and/or the like. An edge cluster having a resource gap/shortage can be identified as a sponsor cluster which can initiate creation of a hive cluster. As an example, a cluster workload module 320 of FIG. 5 and/or the like can provide for identifying a cluster having a resource gap which can be designated as a sponsor cluster for dynamic hive creation.

Processing proceeds to operation S254, where the computing system (e.g., server computer 200 of FIG. 1 or the like) broadcasts a sponsor cluster resource requirement to other edge clusters. As an example, a cluster workload module 320, resource identifier 325, and/or the like can provide for determining a sponsor cluster resource requirement and broadcasting the resource requirement to other edge clusters (e.g., near edge clusters, etc.). In some embodiments, a resource requirement may include pending workload data, needed computing resources/power, and/or the like.

Processing proceeds to operation S256, where the computing system (e.g., server computer 200 of FIG. 1 or the like) can obtain resource commitments from one or more of the other edge clusters. As an example, a resource identifier 325 of FIG. 5 and/or the like may obtain resource commitments from edge clusters in response to a broadcast sponsor resource requirement. In some embodiments, for example, a resource commitment indicates that an edge cluster is a potential candidate to be included in the new hive cluster and can lend resources for the sponsor cluster workload.

As an example, an edge cluster with idle resources can generate a resource commitment in response to a resource requirement broadcast from a sponsor cluster. The edge cluster resource commitments can be provided (e.g., advertised, etc.) to the sponsor cluster. In some embodiments, a resource commitment can include an indication of computing power/resources that can be lent to the sponsor cluster and a duration for lending the resources.

Processing proceeds to operation S258, where the computing system (e.g., server computer 200 of FIG. 1 or the like) selects edge cluster resources (e.g., set of edge clusters, etc.) based, at least in part, on the resource commitments. As an example, a hive cluster manager 330 of FIG. 5 and/or the like may select a set of edge clusters that can be included in a new hive cluster associated with the sponsor cluster. In some embodiments, for example, the computing system may filter potential member clusters (e.g., edge clusters advertising commitments, etc.) and connect selected member clusters to create the hive cluster. For example, in some embodiments, the computing system can filter potential member clusters to resolve the resource gap based on a consideration of computing power versus bandwidth.

Processing proceeds to operation S260, where the computing system (e.g., server computer 200 of FIG. 1 or the like) creates a hive cluster using the selected edge cluster resources (e.g., set of edge clusters, etc.). As an example, a hive cluster manager 330 and/or the like can connect the selected clusters to create the hive cluster (e.g., to assist in sponsor cluster workload, etc.).

Optionally, in some embodiments, processing may proceed to operation S262, where the computing system (e.g., server computer 200 of FIG. 1 or the like) may distribute a sponsor cluster workload across members (e.g., edge clusters) included in the hive cluster. As an example, a hive cluster manager 330 and/or the like can distribute (e.g., spread, etc.) the sponsor cluster workload across the hive cluster members to use idle resources associated with the hive cluster members.

Optionally, in some embodiments, processing may proceed to operation S264, where the computing system (e.g., server computer 200 of FIG. 1 or the like) may calculate a contribution score for each member cluster of the hive cluster. In some embodiments, the contribution score may be proportional to a provided computing power from each member of the hive cluster (e.g., the more member resources used by a sponsor, the higher the member score, etc.). In some embodiments, the computing system can store the contribution score for each member of the hive cluster at the sponsor cluster and at the corresponding member cluster. As an example, a contribution scorer 335 and/or the like may calculate and store a contribution score for each member cluster of a hive cluster. In some embodiments, for example, contribution scores can be used for resource competing in a hive cluster (e.g., higher contribution score for a new sponsor can provide higher priority for resource competing, etc.).

Further Comments and/or Embodiments

Additionally, some embodiments of the present disclosure can provide for dynamically adjusting organization of a hive cluster (e.g., dynamically scaling a hive cluster membership, etc.), for example, based on sponsor cluster resource requirement, member cluster resource commitment, and/or the like. In some embodiments, for example, because a sponsor cluster workload can be dynamic, the hive cluster can be scaled in membership based on requirements, resources, and/or the like. As an example, when a cluster workload is heavy, a hive cluster can be enlarged, for example, through another round of resource requirements broadcasting. As another example, when a cluster workload is light, a hive cluster can free up member clusters.

In some embodiments, a member cluster (e.g., edge cluster in a hive cluster, etc.) can leave the hive cluster in response to completion of the duration provided in a resource commitment. For example, from a cluster member point of view, once the cluster's resource commitment is reached, the member can recycle its resources from the hive cluster (e.g., leave the hive cluster). In some embodiments, when a sponsor cluster resource requirement is met (e.g., pending workload completed, etc.), the sponsor cluster can disconnect. In some embodiments, a hive cluster can complete its session when the sponsor cluster associated with the hive cluster has finished pending computing tasks.

In some embodiments, historical information (e.g., historical cluster information, etc.) may be considered in selecting members for a hive cluster. In an example, a sponsor cluster may have used cluster A and cluster B in a recent period (e.g., recent days, etc.). If cluster A and cluster B met the requirement and provided smooth cooperation, the sponsor cluster may consider cluster A and cluster B as higher priority members for a hive cluster, for example, to decrease hive cluster overhead in cluster creation.

In some embodiments, distance information may be considered in selecting members for a hive cluster. For example, only devices within a defined distance might be considered for hive membership such as to avoid/reduce network impacts for the edge computing platform.

In some embodiments, a hive cluster can create a super hive cluster on demand. As an example, if a hive cluster becomes idle and it obtains a resource requirement from another sponsor cluster, the hive cluster can lend out the hive cluster resources, for example, to reduce network construction overhead.

In some embodiments, a contribution score of a cluster can be used to allow for higher priority in resource competition. For example, in some embodiments, a contribution score can be calculated for members of a hive cluster in a hive cluster life cycle. In some embodiments, a contribution score may be proportional to the resources (e.g., computing power, etc.) provided by a member of the hive cluster. For example, the more resources provided to/used by a sponsor cluster, the higher a contribution score would be for the providing member cluster. The contribution score for a member cluster can be stored in both the sponsor cluster and in the specific member cluster. In some embodiments, contribution scores may be stored for one hive cluster lifecycle. As an example, contribution scores may be stored for a member cluster as [hive-session-id, hive-session-sponsor, score].

In some embodiments, when a cluster becomes a new sponsor cluster, the score for this new sponsor cluster can be sent to potential member cluster candidates. The potential member cluster candidates can verify the score, for example, from the old sponsor cluster that consumed resources of the new sponsor cluster previously. When multiple sponsor clusters are competing for resources, in some embodiments, a member cluster candidate can join the sponsor cluster which has the highest contribution score. In some embodiments, a member cluster candidate can partition resources using the contribution scores, for example, based on ratios, policy, and/or the like.

As an example, multiple new sponsor clusters may be competing for resources from an edge cluster. In such case, a new sponsor cluster that, as an edge cluster, lent out more resources previously can have a greater chance of getting resources from a cluster. In one example, cluster A may be a member of a hive cluster and may have lent four processing cores with a sixty-minute duration. The contribution score for cluster A may be calculated as 240 (e.g., 4*60). Cluster B may be a member of a hive cluster and may have lent out two processing cores with a thirty-minute duration. The contribution score for cluster B may be calculated as 60 (e.g., 2*30). The contribution scores can be recorded in both the member cluster and the sponsor cluster of the hive clusters. After a while, both cluster A and cluster B may be busy and become new sponsor clusters (e.g., sponsor cluster A, sponsor cluster B). The new sponsor cluster A and sponsor cluster B may ask for resources from edge cluster C. Edge cluster C can obtain the scores from the requests of sponsor cluster A and sponsor cluster B. Edge cluster C can verify the scores from the old sponsor cluster that used resources from cluster A and cluster B. Edge cluster C may lend resources to sponsor cluster A because sponsor A has a 240 score which is larger than the 60 score for sponsor cluster B.

According to embodiments of the present disclosure, dynamic hive clusters can allow for more balanced workload using idle resources across edge clusters. In some embodiments, a dynamic hive cluster may avoid a central point of failure, as hive clusters are created on demand using active edge clusters.

Figure 6:
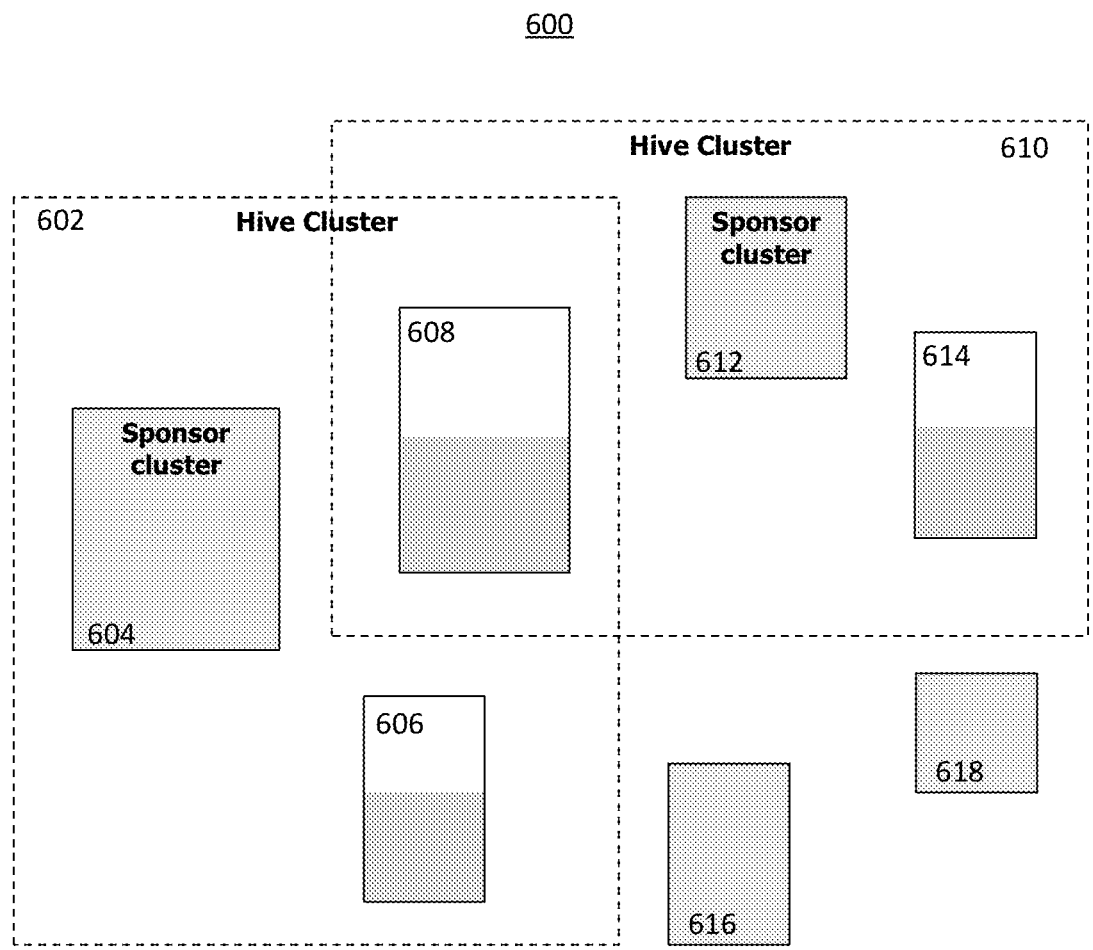
FIG. 6 depicts a block diagram of an example of dynamic hive cluster creation based on edge clusters, according to embodiments of the present invention.

FIG. 6 depicts a block diagram of an example of dynamic hive cluster creation 600 based on edge clusters, according to embodiments of the present invention. Generally speaking, in FIG. 6, shaded portions of clusters indicate resources being used, while non-shaded portions of clusters indicate idle/available resources. In some embodiments, a self-organized on-demand hive cluster can be created when an edge cluster has a heavy workload, for example, becoming a sponsor cluster. As illustrated in FIG. 6, in some embodiments, a sponsor cluster 604 requested resources and formed hive cluster 602 with edge cluster 606 and edge cluster 608 as member of hive cluster 602. Edge cluster 606 and edge cluster 608 have idle resources which may be used for the workload of sponsor cluster 604. A second hive cluster 610 may have been formed by sponsor cluster 612 to use idle resources being lent by edge cluster 608 and edge cluster 614. Edge cluster 616 and edge cluster 618 may not have idle resources that can be shared and as such are not considered for the membership in a hive cluster.

Figure 7:
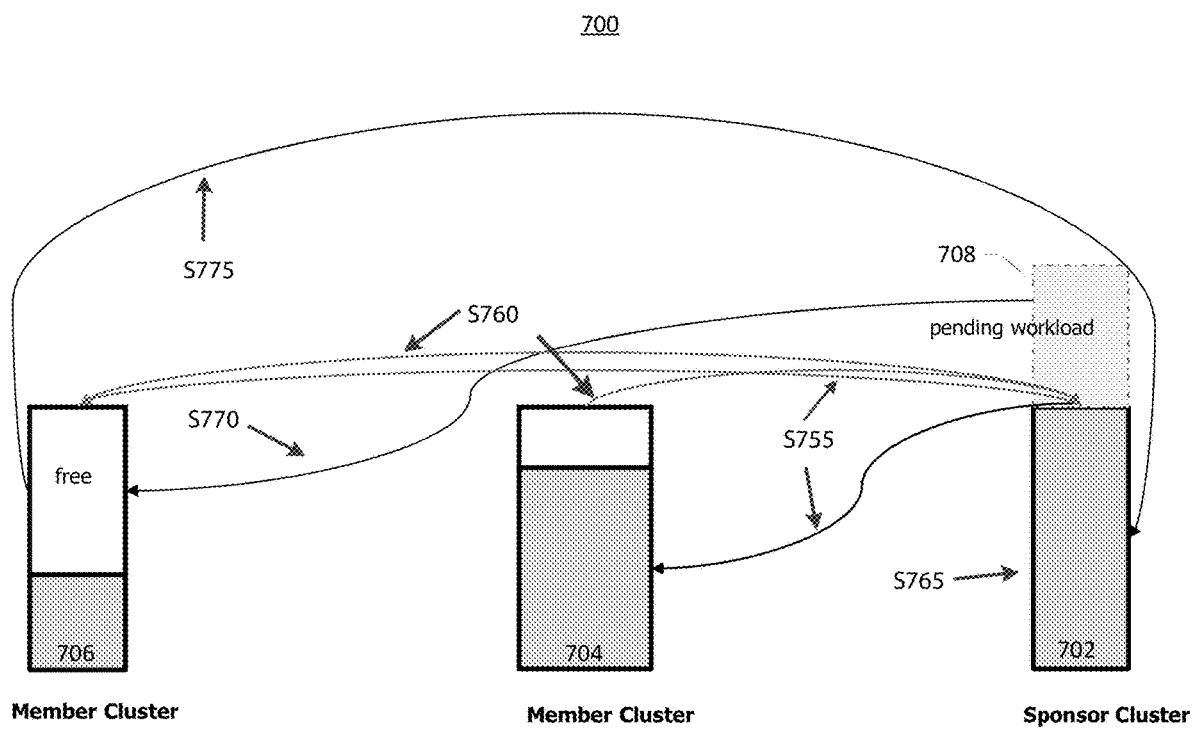
FIG. 7 depicts a flow diagram of example resource sharing in a dynamic hive cluster, according to embodiments of the present invention.

FIG. 7 depicts a block diagram of example dynamic hive cluster 700 where a sponsor cluster uses resources of one or more member clusters in the hive cluster 700, according to embodiments of the present invention. Generally speaking, in FIG. 7, shaded portions of clusters indicate resources being used, while non-shaded portions of clusters indicate idle/available resources. An edge cluster may have identified a resource gap and initiated creation of a dynamic hive cluster. For example, an edge cluster may have a heavy workload, lack of resources, etc. and become a sponsor cluster initiating a new hive cluster. As illustrated in FIG. 7, a hive cluster 700 may include a sponsor cluster 702 and one or more member clusters, such as member cluster 704 and member cluster 706. The sponsor cluster 702 may identify a resource need, for example, associated with pending workload 708, and broadcast (S755) a resource requirement to (i.e., ask for help from) other clusters in the hive cluster, such as member cluster 704 and member cluster 706. The member clusters may provide (S760) an indication (or advertisement) of available (e.g., free, idle, etc.) resources to the source cluster 702. The sponsor cluster 702 may calculate (S765) computing power versus bandwidth and/or the like to determine which member cluster(s) will be provided at least part of the pending workload 708. The sponsor cluster 702 may send (S770) (e.g., publish, etc.) workloads to member cluster 706. In some embodiments, a sponsor cluster may send workloads to clusters with more computing power first, to clusters with better network bandwidth first, and/or based on some other policy, requirement, etc. In some embodiments, a sponsor cluster may pack an application and data in an image and send/execute the image to a registry for remote download by the clusters. The member cluster 712 may process the workload using available (e.g., free, idle, etc.) resources and provide (S775) any workload results back to the sponsor cluster 702.

Figure 8:
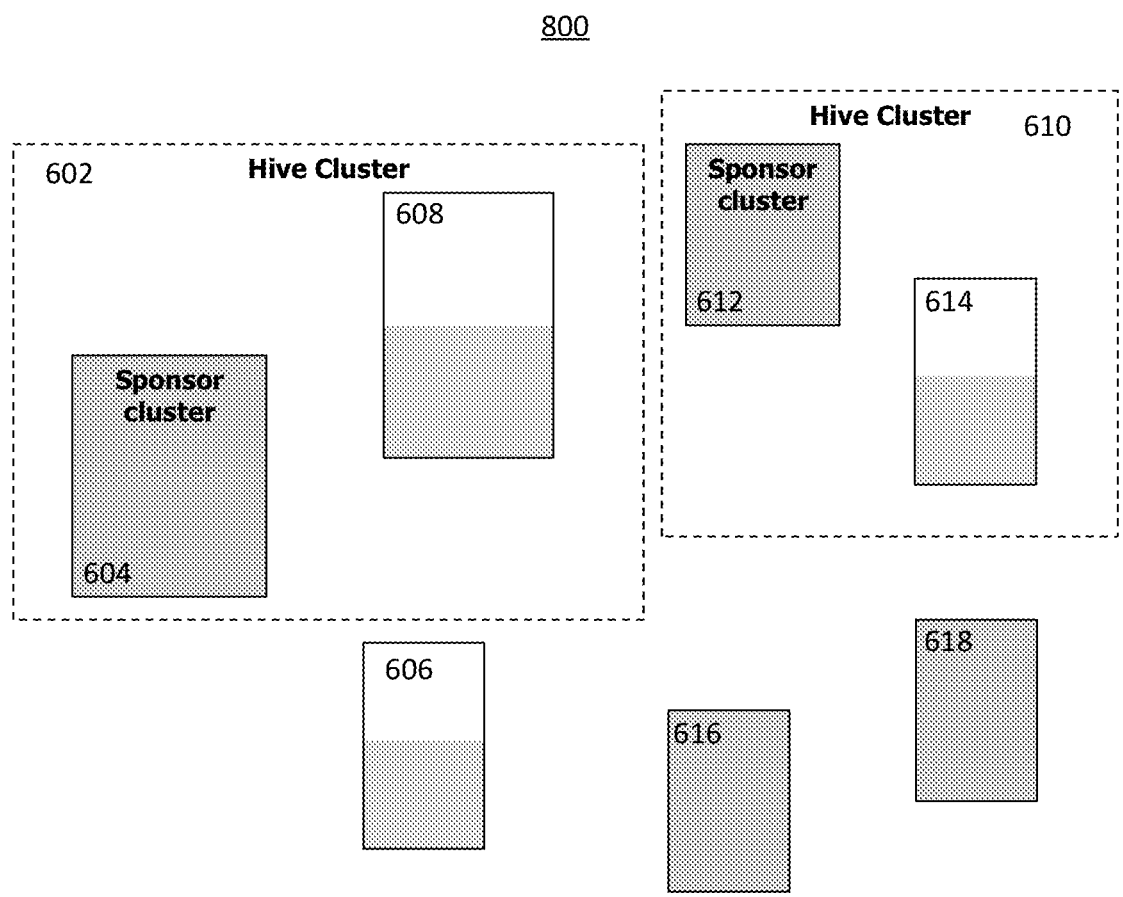
FIG. 8 depicts a block diagram of an example dynamic adjustment of a hive cluster, according to embodiments of the present invention.

FIG. 8 depicts a block diagram of example dynamically adjusted hive clusters 800, according to embodiments of the present invention. Generally speaking, in FIG. 8, shaded portions of clusters indicate resources being used, while non-shaded portions of clusters indicate idle/available resources. In some embodiments, a hive cluster may dynamically adjust hive cluster membership, for example, based on sponsor cluster resource requirements, member cluster resource commitments, and/or the like. For example, as sponsor cluster workloads are dynamically adjusting, member clusters may be added or removed from the hive cluster accordingly. As illustrated in FIG. 8, the workload for sponsor cluster 604 may be reduced (e.g., workload tasks completed, etc.) and as such member clusters having idle resources may be removed from the hive cluster 602. For example, as illustrated, hive cluster 602 may be dynamically adjusted to remove cluster 606 from the hive cluster. In a similar fashion, the workload for sponsor cluster 612 may be reduced and hive cluster 610 may be dynamically adjusted to remove member cluster 608 from the hive cluster. Additionally, in some embodiments, member clusters may leave a cluster after their commitment duration has been reached.

FIGS. 9A through 9C depict workflow diagrams 900, 910, and 940 of example hive cluster creation based on edge clusters, according to embodiments of the present invention. As illustrated in workflow 900 of FIG. 9A, a sponsor cluster may broadcast resource requirements 902 to member clusters. In response, member clusters may send resource commitments 904 to the sponsor cluster.

As illustrated in workflow 910 of FIG. 9B, sponsor cluster operations in response to resource commitments may begin at block 912. Operations proceed to block 914, where candidate cluster resource information, such as bandwidth, commitment, etc. is obtained. Operations proceed to block 916, where the candidate clusters can be sorted (e.g., ordered, etc.) based on, for example, a consideration of computing power versus bandwidth. Operations proceed to block 918, where candidate clusters are selected one at a time to join to the hive cluster based on the sorting/ordering. Operations proceed to block 920, where a determination is made of whether a candidate cluster is available to add to the hive cluster. If no cluster is available, operations proceed to block 928 and end. If a candidate cluster is available, operations proceed to block 922, where a determination is made of whether the candidate cluster joined the hive cluster. If the candidate cluster was not joined the hive cluster, operations return to block 918 and the next candidate cluster is selected. If the candidate cluster was joined to the hive cluster, operations proceed to block 924, where the sponsor resource total (e.g., resource account, etc.) is increased by the available member cluster resources. Operations proceed to block 926, where a determination is made of whether the sponsor resource requirement is met. If the resource requirement is met, operations proceed to block 928 and end. If the resource requirement is not met, operations return to block 918 and the next candidate cluster is selected.

As illustrated in workflow 940 of FIG. 9C, member cluster operations in response to resource requests may begin at block 942. Operations proceed to block 944, where sponsor cluster resource request information (e.g., requested resource commitment, sponsor cluster contribution score, etc.) is obtained. Operations proceed to block 946, where the sponsor cluster score is verified. For example, a contribution score for the resource cluster can be obtained from a previous sponsor cluster that used the resources of the current sponsor cluster. Operations proceed to block 948, where a determination is made of whether the current sponsor score is the highest score. If the current sponsor score is the highest score, operations proceed to block 950, where the request is accepted (e.g., resource commitment generated, etc.). If the current score is not the highest score, operations proceed to block 952, where the request is rejected.

Figure 10:
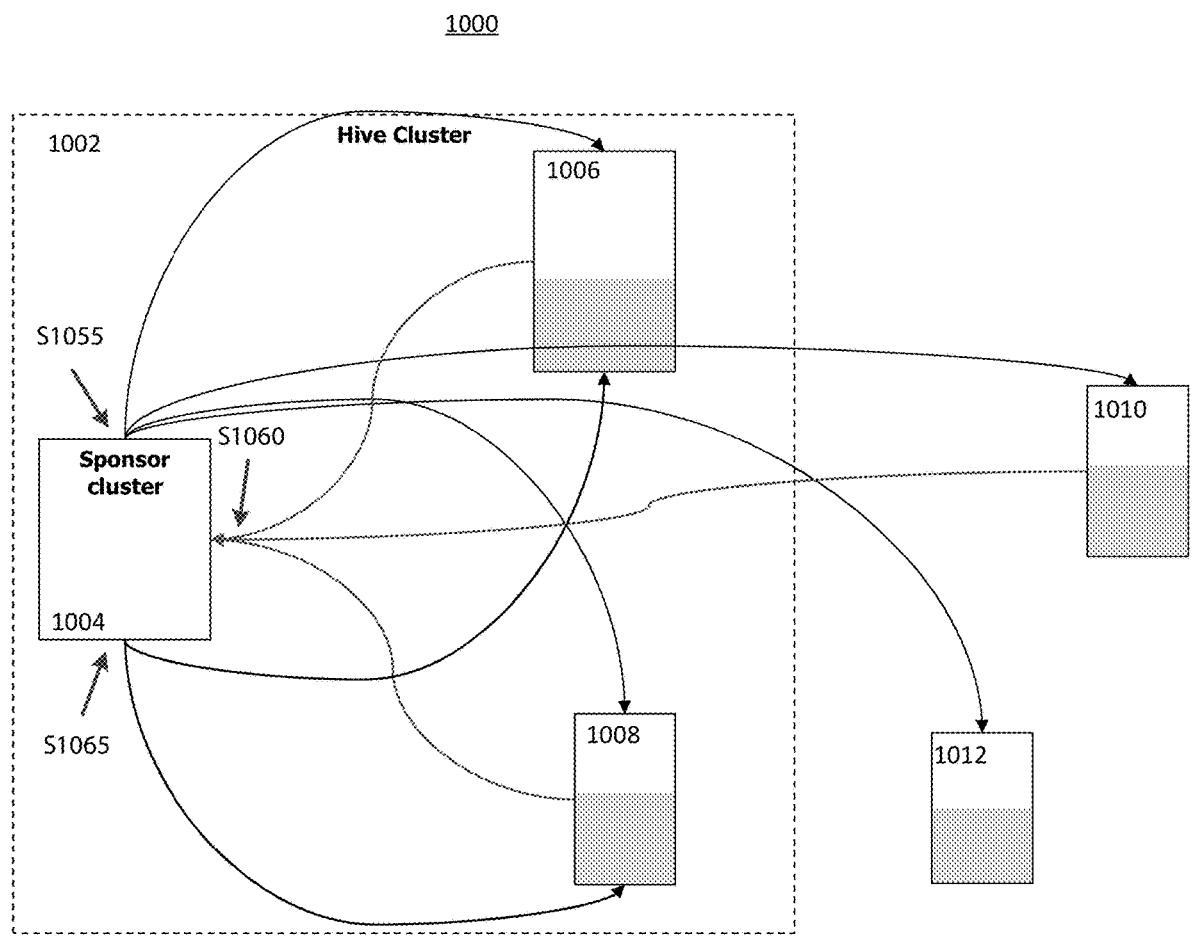
FIG. 10 depicts a flow diagram of an example dynamic hive cluster creation, according to embodiments of the present invention.

FIG. 10 depicts a block diagram of an example dynamic hive cluster creation 1000, according to embodiments of the present invention. Generally speaking, in FIG. 10, shaded portions of clusters indicate resources being used, while non-shaded portions of clusters indicate idle/available resources. As illustrated in FIG. 10, a sponsor cluster 1004 broadcasts (S1055) a resource requirement to other edge clusters, such as edge cluster 1006, edge cluster 1008, edge cluster 1010, edge cluster 1012, and/or the like. Resource commitments can be obtained (S1060) from one or more edge clusters having available resources, such as edge cluster 1006, edge cluster 1008, and edge cluster 1010. The sponsor cluster 1004 can negotiate (S1065) hive cluster membership for one or more of the edge clusters providing resource commitments. The sponsor cluster 1004 can add the one or more edge clusters, such as edge cluster 1006 and edge cluster 1008, as member clusters of hive 1002.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii)

in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
identifying, in an environment that includes a plurality of edge clusters of edge nodes, a first edge cluster having a resource gap, wherein the resource gap comprises a shortage of resources needed to complete a pending workload of the first edge cluster;
broadcasting a resource requirement of the first edge cluster to other edge clusters in the plurality of edge clusters, wherein the resource requirement is a measure of resources needed to resolve the resource gap;
obtaining, based on the resource requirement, resource commitments from one or more of the other edge clusters, wherein a resource commitment from an edge cluster, of the other edge clusters, comprises an indication of idle resources of the edge cluster which can be shared with the first edge cluster;
selecting one or more edge clusters from the one or more of the other edge clusters based, at least in part, on respective resource commitments of each of the one or more of the other edge clusters and respective distances of each of the one or more of the other edge clusters from the first edge cluster;
creating a new cluster including the first edge cluster and the selected one or more edge clusters;
distributing the pending workload of the first edge cluster across the selected one or more edge clusters, wherein the distributing comprises packing an application and data in an image and sending the image to a registry for remote download by the selected one or more edge clusters;
calculating a respective contribution score for each edge cluster of the selected one or more edge clusters in the new cluster, wherein the respective contribution score for a respective edge cluster of the selected one or more edge clusters is proportional to a provided computing power from the respective edge cluster;
processing the pending workload at the selected one or more edge clusters and receiving, at the first edge cluster, results of the processing; and
prioritizing one edge cluster of the selected one or more edge clusters for edge cluster resource competing based on the respective contribution score for the one edge cluster of the selected one or more edge clusters, and wherein the one edge cluster of the selected one or more edge clusters can now have priority for edge cluster resource competing based on previously lending out more resources and having a higher contribution score.

2. The computer-implemented method of claim 1, wherein the resource commitment of the resource commitments includes a duration for sharing resources of the edge cluster from the other edge clusters.

3. The computer-implemented method of claim 2, further comprising removing the edge cluster from the new cluster in response to completion of the duration for the edge cluster when the edge cluster is one of the selected one or more edge clusters.

4. The computer-implemented method of claim 1, wherein the new cluster dynamically adjusts membership of the new cluster based, at least in part, on changing resource requirements of the first edge cluster and changing resource commitments associated with the selected one or more edge clusters.

5. The computer-implemented method of claim 1, wherein the selecting of the one or more edge clusters is further based, at least in part, on historical cluster information.

6. The computer-implemented method of claim 1, further comprising:
storing the respective contribution score for the respective edge cluster at the first edge cluster and at the respective edge cluster; and
utilizing the respective contribution score for the respective edge cluster in determining a future selection of edge clusters.

7. A computer program product comprising a computer readable storage medium having stored thereon:
program instructions programmed to identify, in an environment that includes a plurality of edge clusters of edge nodes, a first edge cluster having a resource gap, wherein the resource gap comprises a shortage of resources needed to complete a pending workload of the first edge cluster;
program instructions programmed to broadcast a resource requirement of the first edge cluster to other edge clusters in the plurality of edge clusters, wherein the resource requirement is a measure of resources needed to resolve the resource gap;
program instructions programmed to obtain, based on the resource requirement, resource commitments from one or more of the other edge clusters, wherein a resource commitment from an edge cluster, of the other edge clusters, comprises an indication of idle resources of the edge cluster which can be shared with the first edge cluster;
program instructions programmed to select one or more edge clusters from the one or more of the other edge clusters based, at least in part, on respective resource commitments of each of the one or more of the other edge clusters and respective distances of each of the one or more of the other edge clusters from the first edge cluster;
program instructions programmed to create a new cluster including the first edge cluster and the selected one or more edge clusters;
program instructions programmed to distribute the pending workload of the first edge cluster across the selected one or more edge clusters, wherein the distributing comprises packing an application and data in an image and sending the image to a registry for remote download by the selected one or more edge clusters;
program instructions programmed to calculate a respective contribution score for each edge cluster of the selected one or more edge clusters in the new cluster, wherein the respective contribution score for a respective edge cluster of the selected one or more edge clusters is proportional to a provided computing power from the respective edge cluster;

program instructions programmed to process the pending workload at the selected one or more edge clusters and receiving, at the first edge cluster, results of the processing; and program instructions programmed to prioritize one edge cluster of the selected one or more edge clusters for edge cluster resource competing based on the respective contribution score for the one edge cluster of the selected one or more edge clusters, and wherein the one edge cluster of the selected one or more edge clusters can now have priority for edge cluster resource competing based on previously lending out more resources and having a higher contribution score.

8. The computer program product of claim 7, wherein the resource commitment of the resource commitments includes a duration for sharing resources of the edge cluster from the other edge clusters.

9. The computer program product of claim 8, the computer readable storage medium having further stored thereon:

program instructions programmed to remove the edge cluster from the new cluster in response to completion of the duration for the edge cluster when the edge cluster is one of the selected one or more edge clusters.

10. The computer program product of claim 7, wherein the new cluster dynamically adjusts membership of the new cluster based, at least in part, on changing resource requirements of the first edge cluster and changing resource commitments associated with the selected one or more edge clusters.

11. The computer program product of claim 7, wherein the selecting of the one or more edge clusters is further based, at least in part, on historical cluster information.

12. The computer program product of claim 7, the computer readable storage medium having further stored thereon:

program instructions programmed to store the respective contribution score for the respective edge cluster at the first edge cluster and at the respective edge cluster; and program instructions programmed to utilize the respective contribution score for the respective edge cluster in determining a future selection of edge clusters.

13. A computer system
comprising: a processor set; and
a computer readable storage medium;
wherein:
the processor set is structured, located, connected and programmed to run program instructions stored on the computer readable storage medium; and
the stored program instructions include:
program instructions programmed to identify, in an environment that includes a plurality of edge clusters of edge nodes, a first edge cluster having a resource gap, wherein the resource gap comprises a shortage of resources needed to complete a pending workload of the first edge cluster;
program instructions programmed to broadcast a resource requirement of the first edge cluster to other edge clusters in the plurality of edge clusters, wherein the resource requirement is a measure of resources needed to resolve the resource gap;

program instructions programmed to obtain, based on the resource requirement, resource commitments from one or more of the other edge clusters, wherein a resource commitment from an edge cluster, of the other edge clusters, comprises an indication of idle resources of the edge cluster which can be shared with the first edge cluster;

program instructions programmed to select one or more edge clusters from the one or more of the other edge clusters based, at least in part, on respective resource commitments of each of the one or more of the other edge clusters and respective distances of each of the one or more of the other edge clusters from the first edge cluster;

program instructions programmed to create a new cluster including the first edge cluster and the selected one or more edge clusters;

program instructions programmed to distribute the pending workload of the first edge cluster across the selected one or more edge clusters, wherein the distributing comprises packing an application and data in an image and sending the image to a registry for remote download by the selected one or more edge clusters;

program instructions programmed to calculate a respective contribution score for each edge cluster of the selected one or more edge clusters in the new cluster, wherein the respective contribution score for a respective edge cluster of the selected one or more edge clusters is proportional to a provided computing power from the respective edge cluster;

program instructions programmed to process the pending workload at the selected one or more edge clusters and receiving, at the first edge cluster, results of the processing; and program instructions programmed to prioritize one edge cluster of the selected one or more edge clusters for edge cluster resource competing based on the respective contribution score for the one edge cluster of the selected one or more edge clusters, and wherein the one edge cluster of the selected one or more edge clusters can now have priority for edge cluster resource competing based on previously lending out more resources and having a higher contribution score.

14. The computer system of claim 13, wherein the resource commitment of the resource commitments includes a duration for sharing resources of the edge cluster from the other edge clusters.

15. The computer system of claim 14, wherein the stored program instructions further comprise:

program instructions programmed to remove the edge cluster from the new cluster in response to completion of the duration for the edge cluster when the edge cluster is one of the selected one or more edge clusters.

16. The computer system of claim 13, wherein the new cluster dynamically adjusts membership of the new cluster based, at least in part, on changing resource requirements of the first edge cluster and changing resource commitments associated with the selected one or more edge clusters.

17. The computer system of claim 13, wherein the selecting of the one or more edge clusters is further based, at least in part, on historical cluster information.

* * * * *